United States Patent
Kim et al.

(10) Patent No.: US 11,047,688 B2
(45) Date of Patent: Jun. 29, 2021

(54) FLANGE-BONDED LOOPBACK FOR FIBER-OPTIC GYROSCOPE (FOG)

(71) Applicants: Steven M. Kim, Santa Clarita, CA (US); Stephan P. Lovstedt, Camarillo, CA (US); Gregory A. Zimmerman, Sandy, UT (US); Wesley A. Snow, Thousand Oaks, CA (US); Ragini Saxena, Simi Valley, CA (US); Ricardo A. Rosete, Syracuse, UT (US)

(72) Inventors: Steven M. Kim, Santa Clarita, CA (US); Stephan P. Lovstedt, Camarillo, CA (US); Gregory A. Zimmerman, Sandy, UT (US); Wesley A. Snow, Thousand Oaks, CA (US); Ragini Saxena, Simi Valley, CA (US); Ricardo A. Rosete, Syracuse, UT (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 477 days.

(21) Appl. No.: 15/783,299

(22) Filed: Oct. 13, 2017

(65) Prior Publication Data
US 2019/0113343 A1 Apr. 18, 2019

(51) Int. Cl.
*G01C 19/72* (2006.01)

(52) U.S. Cl.
CPC ......... *G01C 19/726* (2013.01); *G01C 19/722* (2013.01)

(58) Field of Classification Search
CPC .... G01C 19/72; G01C 19/721; G01C 19/722; G01P 3/363; G01B 9/02
USPC .......................................................... 356/460
See application file for complete search history.

(56) References Cited

U.S. PATENT DOCUMENTS

| | | |
|---|---|---|
| 4,699,451 A | 10/1987 | Mohr |
| 4,793,708 A | 12/1988 | Bednarz |
| 5,394,233 A | 2/1995 | Wang |
| 5,973,783 A | 10/1999 | Goldner et al. |
| 6,763,718 B1 | 7/2004 | Waters et al. |
| 7,355,720 B1 | 4/2008 | Carr |
| 7,808,618 B1 | 10/2010 | Tawney et al. |
| 8,663,731 B2 | 3/2014 | Wang et al. |

(Continued)

FOREIGN PATENT DOCUMENTS

| | | |
|---|---|---|
| CN | 102607548 B | 12/2014 |
| EP | 0228773 A1 | 7/1987 |
| JP | 2005345230 A | 12/2005 |

OTHER PUBLICATIONS

European Search Report corresponding to EP Patent No. 18000808.8, dated Feb. 13, 2019.

(Continued)

*Primary Examiner* — Md M Rahman
(74) *Attorney, Agent, or Firm* — Tarolli, Sundheim, Covell & Tummino LLP

(57) ABSTRACT

One example includes fiber optic gyroscope (FOG) assembly. The FOG assembly includes a spool comprising a flange. The FOG assembly also includes an optical fiber comprising an optical fiber coil portion that is counter-wound in a first orientation and a second orientation opposite the first orientation. The optical fiber portion can be coupled to the flange. The optical fiber further includes a loopback portion with respect to the first orientation that is secured to the flange.

20 Claims, 3 Drawing Sheets

(56) References Cited

U.S. PATENT DOCUMENTS

| | | | |
|---|---|---|---|
| 2003/0230664 A1 | 12/2003 | Healy | |
| 2004/0227032 A1* | 11/2004 | Gregory | B65H 54/12 |
| | | | 242/614 |
| 2009/0122318 A1 | 5/2009 | Kopacz et al. | |
| 2009/0214157 A1* | 8/2009 | Okubo | G02B 6/4214 |
| | | | 385/14 |
| 2011/0311186 A1* | 12/2011 | Adams | G02B 6/3879 |
| | | | 385/78 |

OTHER PUBLICATIONS

Stephens M: "Sensitive Interferometric Accelero Meter," Review of Scientific Instraments, AIP, Melville, NY, US, vol. 64, No. 9, Sep. 1, 1993, pp. 2612-2614, XP000395640, ISSN: 0034-6748, DOI: 10.1063/1.1143878.

European Office Action corresponding to European Application No. 13800603.6-1022, pp. 1-8, dated Jun. 24, 2019.

* cited by examiner

FLANGE-BONDED LOOPBACK FOR FIBER-OPTIC GYROSCOPE (FOG)

TECHNICAL FIELD

This disclosure relates generally to sensor systems, and specifically to a flange-bonded loopback for a fiber-optic gyroscope (FOG).

BACKGROUND

There are a number different types of gyroscope systems that are configured to measure angular rotation rate about a sensitive (e.g., input) axis. Some gyroscopes implement optical signals to determine angular rotation rate about the sensitive axis. As an example, optical signal gyroscopes can monitor changes in phase of the optical signals to determine rotation about the sensitive axis. For example, a fiber optic gyroscope (FOG) can sense a change in orientation using the Sagnac effect, such as based on the interference of light which has passed through a coil of optical fiber (e.g., that is more than a kilometer long). As an example, a FOG can be implemented using two beams from a light source that are injected into the same fiber in opposite directions, such that the beam travelling against the rotation experiences a slightly shorter path delay than the other beam. As a result, the differential phase shift can be measured through interferometry, thus translating angular velocity into a shift of the interference pattern which is measured photometrically.

SUMMARY

One example includes fiber optic gyroscope (FOG) assembly. The FOG assembly includes a spool comprising a flange. The FOG assembly also includes an optical fiber comprising an optical fiber coil portion that is counter-wound in a first orientation and a second orientation opposite the first orientation. The optical fiber portion can be coupled to the flange. The optical fiber further includes a loopback portion with respect to the first orientation that is secured to the flange.

Another example includes a method of fabricating a FOG assembly. The method includes forming a spool that includes a flange. The method also includes forming an optical fiber into an optical fiber coil portion comprising a first orientation of the optical fiber and a second orientation of the optical fiber opposite the first orientation. The optical fiber further includes a first transition portion extending from the optical fiber coil portion and which is associated with the first orientation, and a second transition portion extending from the optical fiber coil portion and which is associated with the second orientation. The method further includes coupling the optical fiber coil portion to the spool, and securing the first transition portion, the second transition portion, and a loopback portion of the optical fiber to the flange.

Another example includes a FOG assembly. The FOG assembly includes a spool comprising a flange and a buffer material coupled to the flange. The buffer material can include a groove preform patterned into the buffer material. The FOG assembly further includes an optical fiber comprising an optical fiber coil portion that is counter-wound in a first orientation and a second orientation opposite the first orientation. The optical fiber portion can be coupled to the flange. The optical fiber further includes a loopback portion with respect to the first orientation that is secured to the flange via the groove preform.

DETAILED DESCRIPTION

This disclosure relates generally to sensor systems, and specifically to a flange-bonded loopback for a fiber-optic gyroscope (FOG). The FOG can include a spool that includes a flange coupled to one of the ends. As described herein, the FOG can include one or two flanges, but for purposes of the flange-bonded loopback, only one flange will be discussed herein. The FOG also includes an optical fiber that includes an optical fiber coil portion that is counter-wound in a first orientation and in a second orientation opposite the first orientation. The optical fiber also includes a first transition portion associated with a first orientation of the optical fiber coil portion and a second transition portion associated with a second orientation of the optical fiber coil portion. The first and second transition portions are arranged proximal to opposite ends of the optical fiber, such that the ends of the optical fiber each receive an optical beam that is implemented to determine angular rotation rate of the FOG about a sensitive axis (e.g., based on a relative phase difference of the optical beam at each of the ends of the optical fiber). The flange includes a first surface to which the optical fiber winding portion is coupled, and also includes a second surface opposite the first surface spool to which a loopback portion of the optical fiber is coupled.

The optical fiber also includes a loopback portion that is coupled to the first and second transition portions and is secured to the flange. As an example, the loopback portion can be secured to the second surface of the flange opposite the first surface to which the optical fiber coil portion is coupled. As a result, the loopback portion is not subject to thermally-induced stresses that can arise from thermal expansion of the optical fiber coil portions of the optical fiber, as can be the case for typical FOG systems in which the loopback portion is coupled to the optical fiber coil portion (e.g., at a peripheral side of the optical fiber coil portion) of the optical fiber. In addition, for example, the first and second transition portions can be arranged symmetrical with respect to each other between the optical fiber coil portion and the loopback portion. Therefore, the optical fiber coil can be arranged symmetrically with respect to each orientation at the loopback portion. Accordingly, the optical signal path through the optical fiber for the optical signal provided at both the first and second transition portions can be symmetrical and equal to substantially mitigate errors in determining the angular rotation rate of the FOG about the sensitive axis.

Figure 1:
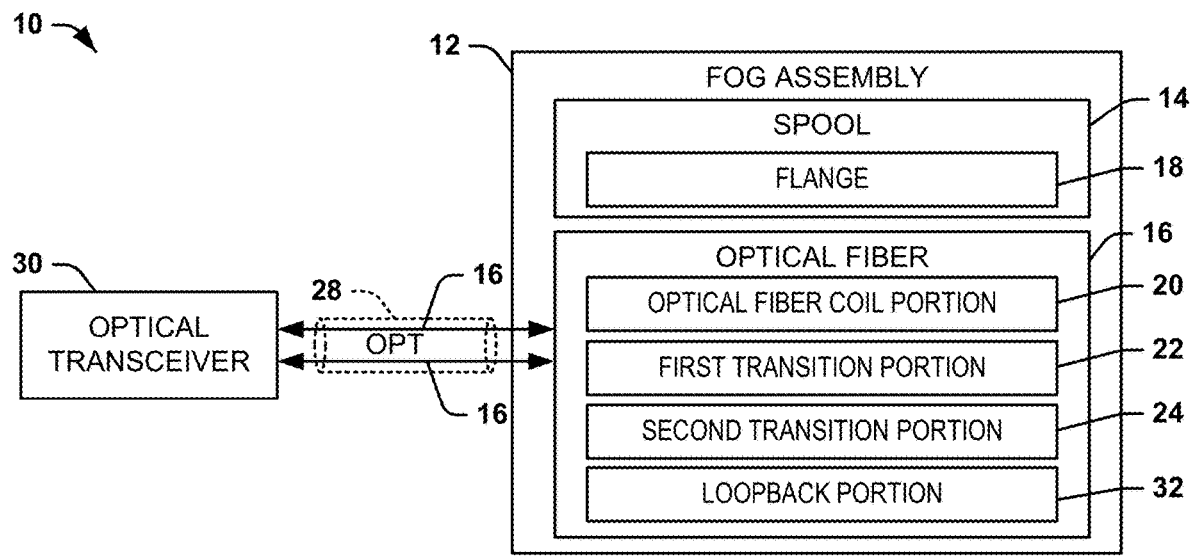
FIG. 1 illustrates an example of a FOG system.

FIG. 1 illustrates an example of a FOG system 10. As an example, the FOG system 10 can be implemented in any of a variety of applications in which accurate rotation of a device or vehicle is required. For example, the FOG system 10 can be used for navigation (e.g., nautical or aerospace) and/or positioning (e.g., satellites or ordnance).

The FOG system 10 includes a FOG assembly 12 that includes a spool 14 and an optical fiber 16. The spool 14 corresponds to a rigid body to which the optical fiber 16 is coupled. As an example, the spool 14 can also include one or more securing components for securing the FOG assembly 12, for example to a vehicle body (not shown), for determining rotation of the FOG assembly 12 about a sensitive axis. In the example of FIG. 1, the optical fiber 16 includes an optical fiber coil portion 20 that is coupled to the spool 14. The optical fiber coil portion 20 includes the optical fiber 16 being counter-wound in a first orientation about a central axis (e.g., a sensitive axis) and in a second orientation (e.g., the sensitive axis) opposite the first orientation. As an example, the optical fiber coil portion 20 can be secured in a solidified liquid material (e.g., an epoxy or other type of material that holds the optical fiber 16 in a ring-shaped arrangement of the optical fiber coil portion 20; hereinafter referred to as "potting material"). In the example of FIG. 1, the spool 14 includes a flange 18. For example, the flange 18 can have an outer diameter that is approximately equal to (e.g., slightly greater than) an outer diameter of the optical fiber coil portion 20. Thus, the flange 18 can have a first surface to which the optical fiber coil portion 20 is coupled and a second surface opposite the first surface. As an example, the flange 18 can be formed integral with the spool 14, or can be formed as a separate piece that is secured to other portions of the spool 14.

The optical fiber 16 is also demonstrated as having a first transition portion 22 and a second transition portion 24. As described herein, the term "transition portion" with respect to the first transition portion 22 and the second transition portion 24 of the optical fiber 16 describes respective portions of the optical fiber 16 between the optical fiber coil portion 20 (e.g., as extending from the potting material) and a longitudinal coupling portion 28. The longitudinal coupling portion 28 is coupled to an optical transceiver 30 that is configured to generate an optical signal OPT that is provided to each of the respective ends associated with the optical fiber 16. As described herein, the term "longitudinal coupling" with respect to the optical fiber 16 refers to a portion of the optical fiber 16 that is coupled to and extends between the first and second transition portions 22 and 24 and the optical transceiver 30, such that two separate lengths of the optical fiber 16 are coupled together along the length of the longitudinal coupling portion 28 to form a bidirectional fiber-optic cable. As an example, a portion of the longitudinal coupling portion 30 can be secured to the flange 18.

In addition, as described in greater detail herein, the optical fiber 16 includes a loopback portion 32. As described herein, the term "loopback portion" describes a partial loop of the first transition portion 22 and/or the longitudinal coupling portion 28 of the optical fiber 16 that is coupled to the first and second transition portions 22 and 24, such that the loopback portion 32 substantially reverses the direction orientation of the optical fiber 16 with respect to the first orientation direction of the optical fiber coil portion 20. The loopback portion 32 is coupled to the flange 18, such as at one of the first and second surfaces (e.g., the second surface) of the flange 18, along with the first and second transition portions 22 and 24. Therefore, the loopback portion 32 being secured to the flange 18 enables the optical fiber 16 to be implemented to provide a symmetric signal path for the optical signal OPT in each direction through the optical fiber 16. Additionally, by securing the loopback portion 32 to the second surface of the flange 18, as opposed to the outer periphery of the optical fiber coil portion 20 (e.g., the peripheral outer surface of the potting material) of the optical fiber 16 (e.g., as arranged in typical FOG systems), thermal stresses that can affect the optical fiber 16, and thus can affect the optical signal OPT resulting in measurement errors, can be substantially mitigated.

Figure 2:
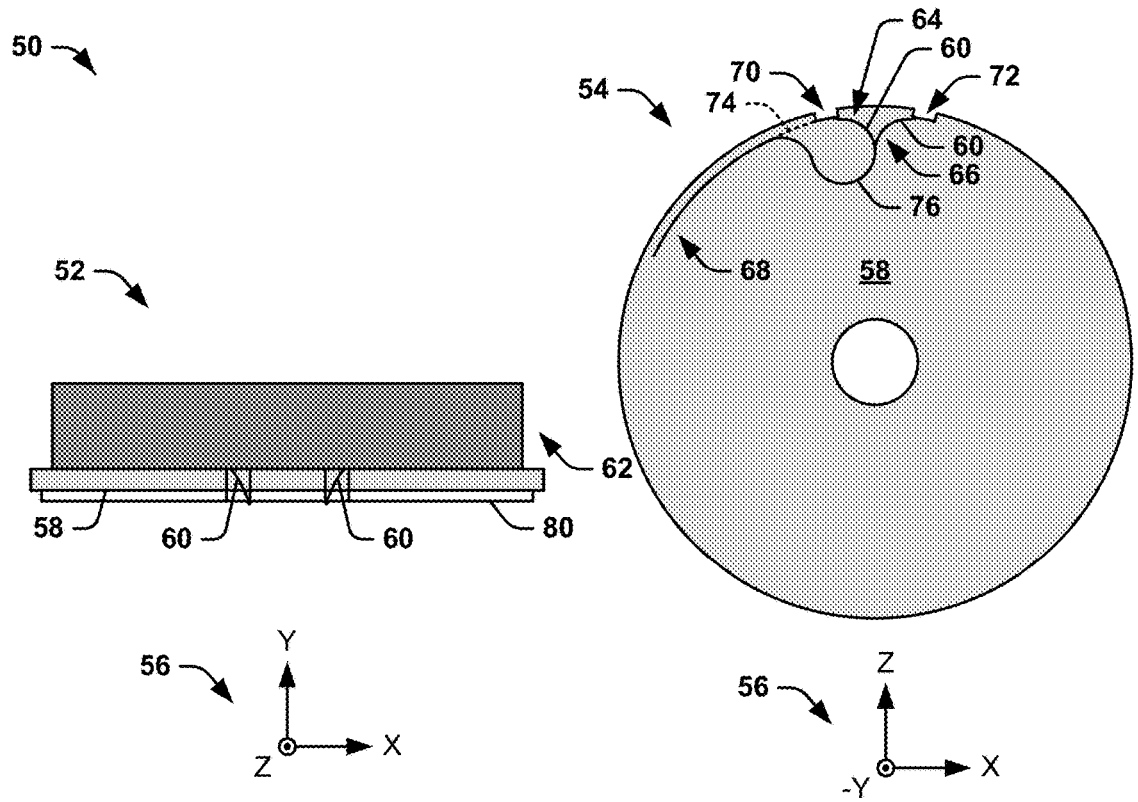
FIG. 2 illustrates an example diagram of a FOG spool.

FIG. 2 illustrates an example diagram 50 of a FOG assembly. The FOG assembly is demonstrated in the diagram 50 in a first view 52 and a second view 54 that are orthogonal based on the Cartesian coordinate system 56. The FOG assembly can correspond to the FOG assembly 12 in the example of FIG. 1. Therefore, reference is to be made to the example of FIG. 1 in the following description of the example of FIG. 2.

The FOG assembly includes a flange 58 that can be configured as part of a spool (e.g., the spool 14 in the example of FIG. 1). The FOG assembly also includes an optical fiber 60 that is demonstrated in the first view 52 example of FIG. 2 as interconnecting an optical fiber coil portion 62 and each of a first transition portion 64 and a second transition portion 66. The first and second transition portions 64 and 66 correspond to opposite orientations of the optical fiber 60 with respect to the optical fiber coil portion 62. In the example of FIG. 2, the first and second transition portions 64 and 66 are demonstrated as symmetric with respect to each other (e.g., mirror-images) between the respective optical fiber coil portion 62 and a longitudinal coupling portion 68.

In the example of FIG. 2, the first transition portion 64 is demonstrated as being threaded through a respective first notch 70 in the flange 58 and the second transition portion 66 is demonstrated as being threaded through a respective second notch 72 in the flange 58. Therefore, the first notch 70 is configured to receive the first transition portion 64 of the optical fiber 60 at approximately a transition to the optical fiber coil portion 62 in the first orientation, whereas the optical fiber 60 is demonstrated as a dashed line 74 as it enters the optical fiber coil portion 62 in the first orientation on the opposing side of the flange 58. Similarly, the second notch 72 is configured to receive the second transition portion 66 of the optical fiber 60 at approximately a transition to the second optical fiber coil portion 62 in the second orientation. Accordingly, the notches 70 and 72 can facilitate securing of the optical fiber 60 to the second surface of the flange 58.

In the example of FIG. 2, the longitudinal coupling portion 68 includes a loopback portion 76 that is secured to the second surface of the flange 58. As an example, the flange 58 can be formed to include a groove preform that is configured to receive at least one of the first transition portion 64, the second transition portion 66, and the longitudinal coupling portion 68, as well as the loopback portion 76. As a result, the groove preform can further secure the mounting of the first transition portion 64, the second transition portion 66, and/or the longitudinal coupling portion 68. Accordingly, the groove preform can be configured to mitigate lateral movement of the optical fiber 60 along the second surface of the flange 58, and can substantially mitigate breakage of the optical fiber 60 at the loopback portion 76. Furthermore, the groove preform can facilitate repeatable positioning of the loopback portion 76 from one FOG assembly to the next in a mass-fabrication of multiple FOG assemblies to ensure substantially similar performance among the FOG assemblies fabricated.

As described previously, the loopback portion 76 being secured to the flange 58 enables the optical fiber 60 to be implemented to provide a symmetric signal path for the optical signal OPT in each direction through the optical fiber 60. Particularly, in the example of FIG. 2, based on the symmetric arrangement of the first and second transition portions 64 and 66 between the optical fiber coil portion 62 and the longitudinal coupling portion 68, and because the joining of the first and second transition portions 64 and 66 at the longitudinal coupling portion 68 is substantially axially aligned with a center of the flange 58, then the signal path of the optical signal OPT can be approximately equal from each of the opposing ends of the optical fiber 60 (e.g., at the optical transceiver 30) to the optical fiber coil portion 62. Stated another way, the combined length of the first transition portion 64 and the first orientation of the optical fiber coil portion 62 is approximately equal to the combined length of the second transition portion 66 and the second orientation of the optical fiber coil portion 62. Accordingly, the FOG system that includes the FOG assembly in the diagram 50 can operate symmetrically to substantially mitigate errors associated with interpreting a phase difference of the optical signal OPT at each end of the optical fiber 60.

In addition, by securing the loopback portion 76 to the flange 58, as opposed to the outside diameter of the optical fiber as arranged in typical FOG systems, thermal stresses that can affect the optical fiber 60 can be substantially mitigated. As a result, as opposed to typical FOG systems that are vulnerable to thermal expansion of the optical fiber coil portion 62 that can provide stress of the loopback portion, the loopback portion 76 in the diagram 50 is substantially protected from stresses caused by thermal expansion of the optical fiber coil portion 62. Furthermore, the flange 58 can further include a buffer material, demonstrated in the first view 52 at 80, that is disposed on the second surface of the flange 58. As an example, the buffer material 80 can have a coefficient of thermal expansion (CTE) that is between the CTE of the optical fiber 60 and the CTE of the flange 58. For example, the buffer material 80 can be formed to include the groove preform, as described previously. Thus, the buffer material 80 can further mitigate thermal stresses that can affect the loopback portion 76.

The FOG assembly of the diagram 50 can thus exhibit a number of performance advantages over typical FOG systems. Particularly, based on the securing of the loopback portion 76 to the flange 58, the FOG assembly in the diagram 50 can substantially eliminate operator loopback build variability (e.g., based on the groove preform) to substantially improve fabrication cost and consistency. Additionally, the securing of the loopback portion 76 to the flange 58 can also result in substantial reduction of thermal Shupe sensitivity, and can also result in substantial reduction of "Tdotdot" sensitivity in measuring the angular rotation rate of the FOG system. Accordingly, the FOG assembly in the diagram 50 can exhibit significant improvements in measuring rotation rate of the FOG system about a sensitive axis.

As described in the example of FIG. 2, the diagram 50 demonstrates that the loopback portion 76 is coupled to the second surface of the flange 58, opposite the first surface of the flange 58 to which the optical fiber coil portion 62 is coupled. However, it is to be understood that other orientations and other ways to secure the loopback portion 76 of the optical fiber 60 can be provided, such that the securing of the loopback portion 76 to the flange 58 is not limited to as demonstrated in the example of FIG. 2. As an example, the flange 58 can have a diameter that is sufficiently greater than the optical fiber coil portion 62 to facilitate securing the loopback portion 76 to the first surface of the flange 58, and thus the same surface to which the optical fiber coil portion 62 is coupled. As another example, the flange 58 can include at least one portion that extends orthogonally with respect to the planar diameter of the flange 58, and thus can extend along the Y-axis or −Y-axis with respect to the Cartesian coordinate system 56. Accordingly, as described herein, the securing of the first and second transition portions 64 and 66 and the loopback portion 76 is not limited to as described in the example of FIG. 2.

Figure 3:
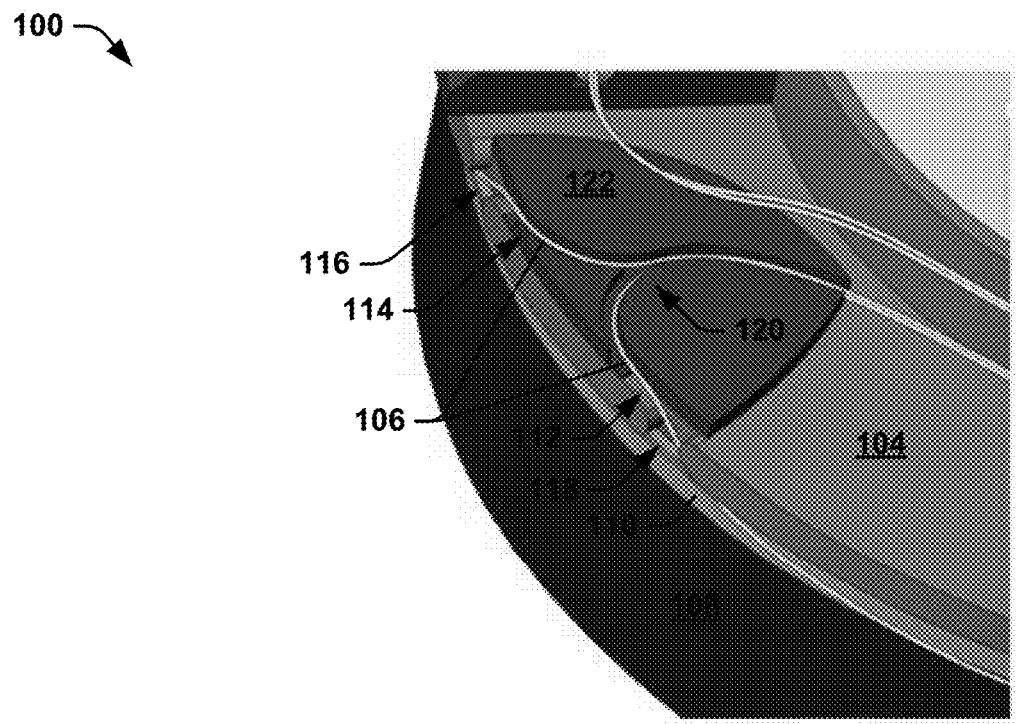
FIG. 3 illustrates an example plan view of a FOG spool.

FIG. 3 illustrates an example plan view of a FOG assembly 100. The FOG assembly 100 can correspond to the FOG assembly 12 in the example of FIG. 1, or can represent the FOG assembly demonstrated in the diagram 50 in the example of FIG. 2. Therefore, reference is to be made to the examples of FIGS. 1 and 2 in the following descriptions of the examples of FIG. 3.

The FOG assembly 100 includes a flange 104 that can be coupled to and/or part of a spool (e.g., the spool 14 in the example of FIG. 1). The FOG assembly 100 also includes an optical fiber 106 that includes an optical fiber coil portion 108 (e.g., that is encased/secured within a potting material) that is wound in opposite orientations. The optical fiber coil portion 108 is coupled to the flange 104 (e.g., a first surface). In the example of FIG. 3, the FOG assembly 100 includes a buffer material 110 that interconnects the flange 104 and the optical fiber coil portion 108. As an example, the buffer material 110 can have a CTE that is between the CTE of the optical fiber coil portion 108 (e.g., of the potting material) and the CTE of the flange 104. As another example, the buffer material 110 can be formed from the same material as the optical fiber coil portion 108, and can thus have the same CTE as the optical fiber coil portion 108. For example, the thermo-mechanical stress induced in the buffer material 110 due to a CTE mismatch between the optical fiber coil portion 108 and the buffer material 110 can decrease away from the flange 104 in an axial direction. As a result, the active part of the optical fiber coil portion 108 that includes an optical fiber with the optical signal OPT propagating therein, the stress due to the CTE mismatch at the coupling of this assembly to the flange 104 is minimized. Thus, the buffer material 110 can mitigate thermal stresses that can affect the optical fiber 106. The optical fiber 106 also includes a first transition portion 112 and a second transition portion 114 that are coupled to the optical fiber coil portion 108 via a first notch 116 and a second notch 118, respectively. The optical fiber 106 also includes a loopback portion 120 that is coupled to the first and second transition portions 112 and 114.

In addition, the FOG assembly 100 includes a groove preform that is formed in a buffer material 122 on the second surface of the flange 104. The groove preform is configured to secure the first transition portion 112, the second transition portion 114, and the loopback portion 120 to the second surface of the flange 104. For example, the groove preform can be formed from a buffer material having a CTE that is between the CTE of the optical fiber 106 and the flange 104. The groove preform can thus provide for a repeatable fabrication of the FOG assembly 100 with respect to the securing of the optical fiber 106 (e.g., including the first transition portion 112, the second transition portion 114, and the loopback portion 120) to the flange 104. As a result, the FOG assembly 100 can be easily fabricated, and can be fabricated in a manner that is consistent (e.g., with respect to performance) from one FOG assembly 100 to the next in a mass fabrication of FOG assemblies 100.

Figure 4:
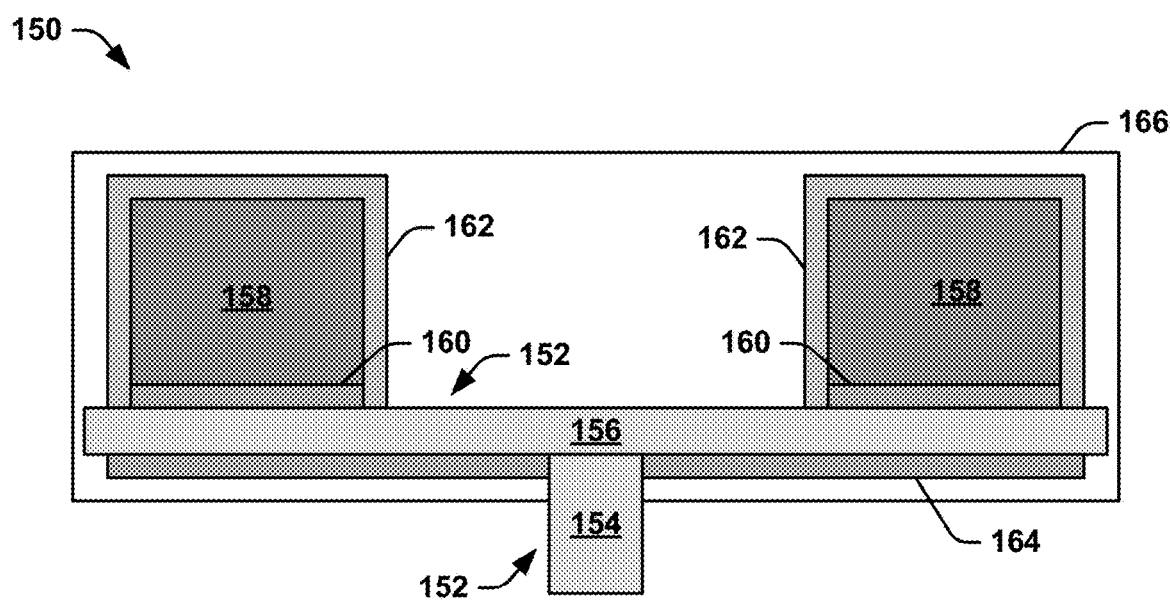
FIG. 4 illustrates another example plan view of a FOG spool.

FIG. 4 illustrates an example cross-sectional view of a FOG assembly 150. The FOG assembly 150 is demonstrated as an approximate diametrical cross-sectional view of the FOG assembly in the diagram 50 in the example of FIG. 2.

Therefore, reference is to be made to the examples of FIGS. 1 and 2 in the following description of the example of FIG. 4.

The FOG assembly 150 includes a spool 152 that includes a securing component 154 (e.g., a screw or bolt) and a flange 156. The FOG assembly 150 also includes a fiber optic coil portion 158 that is coupled to the flange 156 (on a first surface of the flange 156) via a buffer material 160. In the example of FIG. 4, the fiber optic coil portion 158 and the buffer material 160 are enclosed within a magnetic shielding material 162 to substantially mitigate external electromagnetic interference that can deleteriously affect the performance of the associated FOG system. The FOG assembly 150 also includes a buffer material 164 that can be deposited on at least a portion of the flange 156 (e.g., the second surface of the flange 156). As an example, the buffer material 164 can be implemented to form a groove preform to receive the optical fiber (not shown in the example of FIG. 4), such as the first and second transition portions and/or the loopback portion of the optical fiber, to provide for repeatable fabrication of substantially identical arrangements of the first and second transition portions and/or the loopback portion from one FOG assembly 150 to the next. Additionally, the FOG assembly 150 can be substantially enclosed within a covering material 166 to substantially protect the components within the covering material 166.

Figure 5:
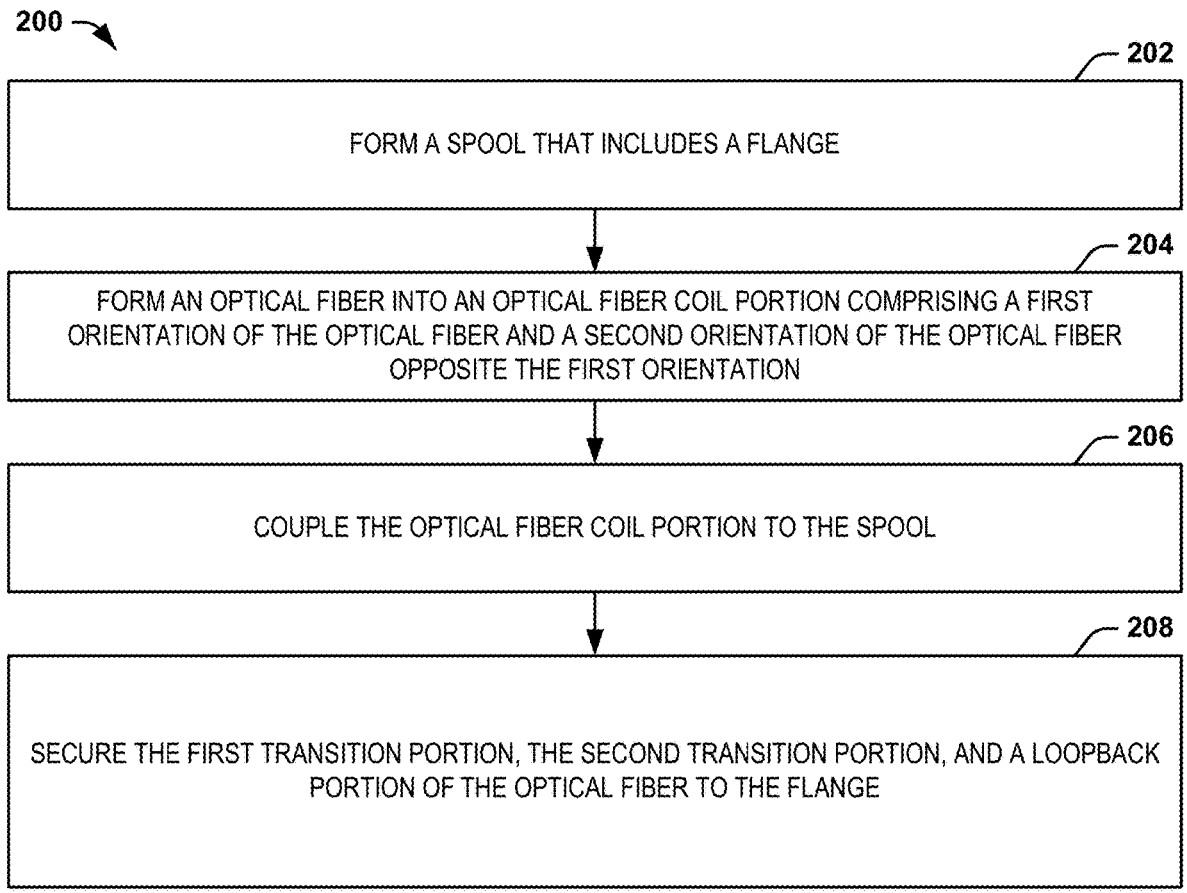
FIG. 5 illustrates an example of a method for fabricating a FOG.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for fabricating a FOG assembly (e.g., the FOG assembly 12). At 202, a spool (e.g., the spool 14) that includes a flange (e.g., the flange 18) is formed. At 204, an optical fiber (e.g., the optical fiber 16) is formed into an optical fiber coil portion (e.g., the optical fiber coil portion 20) comprising a first orientation of the optical fiber and a second orientation of the optical fiber opposite the first orientation. The optical fiber further includes a first transition portion (e.g., the first transition portion 22) extending from the optical fiber coil portion and being associated with the first orientation and a second transition portion (e.g., the second transition portion 24) extending from the optical fiber coil portion and being associated with the second orientation. At 206, the optical fiber coil portion is coupled to the spool. At 208, the first transition portion, the second transition portion, and a loopback portion (e.g., the loopback portion 32) of the optical fiber are secured to the flange.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A fiber optic gyroscope (FOG) assembly comprising:
   a spool comprising a flange; and
   an optical fiber comprising an optical fiber coil portion that is counter-wound in a first orientation and a second orientation opposite the first orientation, the optical fiber portion being coupled to the flange, the optical fiber further comprising a loopback portion with respect to the first orientation that is secured to the flange.

2. The FOG assembly of claim 1, wherein the optical fiber coil is coupled to a first surface of the flange, and wherein the flange further comprises a second surface opposite the first surface, wherein the loopback portion is coupled to the second surface of the flange.

3. The FOG assembly of claim 2, wherein the optical fiber further comprises a first transition portion associated with the first orientation, a second transition portion associated with the second orientation, and a longitudinal coupling portion that are secured to the second surface of the flange, wherein the first and second transition portions of the optical fiber are secured to the second surface of the flange and are arranged to be approximately symmetrically arranged with each other on the flange.

4. The FOG assembly of claim 3, wherein the flange further comprises:
   a first notch arranged at a periphery of the flange and being configured to receive the first transition portion of the optical fiber extending from the optical fiber coil portion from the first surface of the flange to the second surface of the flange; and
   a second notch arranged at the periphery of the flange and being configured to receive the second transition portion of the optical fiber extending from the optical fiber coil portion from the first surface of the flange to the second surface of the flange.

5. The FOG assembly of claim 3, wherein the loopback portion comprises at least a portion of the first transition portion and the longitudinal coupling portion.

6. The FOG assembly of claim 1, wherein the flange comprises a groove preform configured to receive and secure the optical fiber along a length of the groove preform with respect to at least the loopback portion.

7. The FOG assembly of claim 6, further comprising a buffer material layer disposed on the flange, wherein the groove preform is formed in the buffer material layer to receive the optical fiber for securing the optical fiber comprising the loopback portion to the flange.

8. The FOG assembly of claim 1, wherein the optical fiber further comprises a first transition portion associated with the first orientation, a second transition portion associated with the second orientation, and a longitudinal coupling portion that are secured to the second surface of the flange, wherein the first and second transition portions of the optical fiber are arranged to be approximately symmetrically arranged with each other on the flange.

9. The FOG assembly of claim 1, further comprising an optical transceiver configured to generate an optical signal that is provided to each end of the optical fiber, wherein signal paths of the optical signal from each end of the optical fiber to a portion of the optical fiber in which a winding of the spool of the optical fiber reverses orientation is approximately equal.

10. A method of fabricating a fiber optic gyroscope (FOG) assembly, the method comprising:
forming a spool that includes a flange;
forming an optical fiber into an optical fiber coil portion comprising a first orientation of the optical fiber and a second orientation of the optical fiber opposite the first orientation, the optical fiber further comprising a first transition portion extending from the optical fiber coil portion and being associated with the first orientation and a second transition portion extending from the optical fiber coil portion and being associated with the second orientation;
coupling the optical fiber coil portion to the spool; and
securing the first transition portion, the second transition portion, and a loopback portion of the optical fiber to the flange.

11. The method of claim 10, wherein forming the spool comprises forming the spool and the flange to be integral with respect to a fabrication material associated with each of the spool and the flange.

12. The method of claim 10, wherein coupling the optical fiber coil portion to a first surface of the flange, and wherein securing the first and second transition portions and the loopback portion of the optical fiber coil comprises securing the first transition portion, the second transition portion, and the loopback portion to a second surface of the flange opposite the first surface of the flange.

13. The method of claim 12, further comprising:
forming a first notch in a periphery of the flange, wherein securing the first transition portion to the second surface of the flange comprises extending the first transition portion from the optical fiber coil portion on the first surface of the flange to the second surface of the flange via the first notch; and
forming a second notch in the periphery of the flange, wherein securing the second transition portion to the second surface of the flange comprises extending the second transition portion from the optical fiber coil portion on the first surface of the flange to the second surface of the flange via the second notch.

14. The method of claim 10, wherein the securing the first and second transition portions and the loopback portion of the optical fiber coil comprises securing the first and second transition portions such that the first and second transition portions of the optical fiber are arranged to be approximately symmetrically arranged with respect to each other on the flange between the optical coil portion and a longitudinal coupling portion of the optical fiber.

15. The method of claim 10, further comprising:
depositing a buffer material on the flange; and
forming a groove preform in the buffer material, wherein securing the first and second transition portions and the loopback portion of the optical fiber coil comprises securing the first transition portion, the second transition portion, and the loopback portion of the optical fiber to the flange in the groove preform.

16. A fiber optic gyroscope (FOG) assembly comprising:
a spool comprising a flange;
a buffer material coupled to the flange, the buffer material comprising a groove preform patterned into the buffer material; and
an optical fiber comprising an optical fiber coil portion that is counter-wound in a first orientation and a second orientation opposite the first orientation, the optical fiber portion being coupled to the flange, the optical fiber further comprising a loopback portion with respect to the first orientation that is secured to the flange via the groove preform.

17. The FOG assembly of claim 16, wherein the optical fiber coil is coupled to a first surface of the flange, and wherein the flange further comprises a second surface opposite the first surface, wherein the loopback portion is coupled to the second surface of the flange.

18. The FOG assembly of claim 17, wherein the optical fiber further comprises a first transition portion associated with the first orientation, a second transition portion associated with the second orientation, and a longitudinal coupling portion that are secured to the second surface of the flange, wherein the first and second transition portions of the optical fiber are secured to the second surface of the flange and are arranged to be approximately symmetrically arranged with each other on the flange.

19. The FOG assembly of claim 18, wherein the flange further comprises:
a first notch arranged at a periphery of the flange and being configured to receive the first transition portion of the optical fiber extending from the optical fiber coil portion from the first surface of the flange to the second surface of the flange; and
a second notch arranged at the periphery of the flange and being configured to receive the second transition portion of the optical fiber extending from the optical fiber coil portion from the first surface of the flange to the second surface of the flange.

20. The FOG assembly of claim 16, wherein the optical fiber further comprises a first transition portion associated with the first orientation, a second transition portion associated with the second orientation, and a longitudinal coupling portion that are secured to the second surface of the flange, wherein the first and second transition portions of the optical fiber are arranged to be approximately symmetrically arranged with each other on the flange.

* * * * *